United States Patent
Ariga

(10) Patent No.: US 9,756,258 B2
(45) Date of Patent: Sep. 5, 2017

(54) IMAGE CAPTURING APPARATUS, IMAGE CAPTURING METHOD, AND CONTROL METHOD FOR REDUCING THE INFLUENCE OF FLICKER ON STILL IMAGE EXPOSURE

(71) Applicant: CANON KABUSHIKI KAISHA, Tokyo (JP)

(72) Inventor: Yuichi Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/520,728

(22) Filed: Oct. 22, 2014

(65) Prior Publication Data

US 2015/0116537 A1    Apr. 30, 2015

(30) Foreign Application Priority Data

Oct. 30, 2013    (JP) .................................. 2013-225817

(51) Int. Cl.
*H04N 5/235*    (2006.01)

(52) U.S. Cl.
CPC ......... *H04N 5/2357* (2013.01); *H04N 5/2353* (2013.01)

(58) Field of Classification Search
CPC .. H04N 5/2357; H04N 5/2353; H04N 1/6086; H04N 5/21; H04N 9/71
See application file for complete search history.

(56) References Cited

U.S. PATENT DOCUMENTS

| | | | | |
|---|---|---|---|---|
| 2008/0130744 A1* | 6/2008 | Huang | .................. | G06T 7/0081 375/240.08 |
| 2009/0033763 A1* | 2/2009 | Tsukihara | ............ | H04N 5/2357 348/226.1 |
| 2011/0181753 A1* | 7/2011 | Sugie | ................. | H04N 5/23296 348/226.1 |

(Continued)

FOREIGN PATENT DOCUMENTS

| | | |
|---|---|---|
| CN | 1993982 A | 7/2007 |
| CN | 101009760 A | 8/2007 |

(Continued)

OTHER PUBLICATIONS

The above foreign patent documents were cited in a Mar. 30, 2017 Chinese Office Action, which is enclosed with an English Translation, that issued in Chinese Patent Application No. 201410601645.0.

(Continued)

*Primary Examiner* — Mekonnen Dagnew
(74) *Attorney, Agent, or Firm* — Cowan, Liebowitz & Latman, P.C.

(57) ABSTRACT

There is provided an image capturing apparatus comprising an image capturing unit. A control unit controls the image capturing unit to capture a first image having exposure unevenness caused by flicker in a light source. A detection unit detects a timing at which there is a low change in a light amount caused by the flicker, based on the exposure unevenness in the first image. An accepting unit accepts an image capturing instruction. The control unit controls the image capturing unit to capture a second image at the detected timing in response to the image capturing instruction.

13 Claims, 11 Drawing Sheets

(56) References Cited

U.S. PATENT DOCUMENTS

| | | | | |
|---|---|---|---|---|
| 2012/0320232 A1* | 12/2012 | Trumbo | ............... | H04N 5/2357 |
| | | | | 348/226.1 |
| 2014/0153839 A1* | 6/2014 | Tsuzuki | ............... | H04N 5/2355 |
| | | | | 382/254 |
| 2014/0211041 A1* | 7/2014 | McCrackin | ............ | H04N 9/735 |
| | | | | 348/223.1 |

FOREIGN PATENT DOCUMENTS

| | | |
|---|---|---|
| CN | 102158654 A | 8/2011 |
| JP | 2004-193922 | 7/2004 |
| JP | 2006-222935 A | 8/2006 |
| JP | 2008-011226 | 1/2008 |
| WO | 2013/084605 A1 | 6/2013 |

OTHER PUBLICATIONS

The above foreign patent documents were cited in a Jun. 26, 2017 Japanese Office Action, which is enclosed without an English Translation, that issued in Japanese Patent Application No. 2013225817.

* cited by examiner

F I G. 10
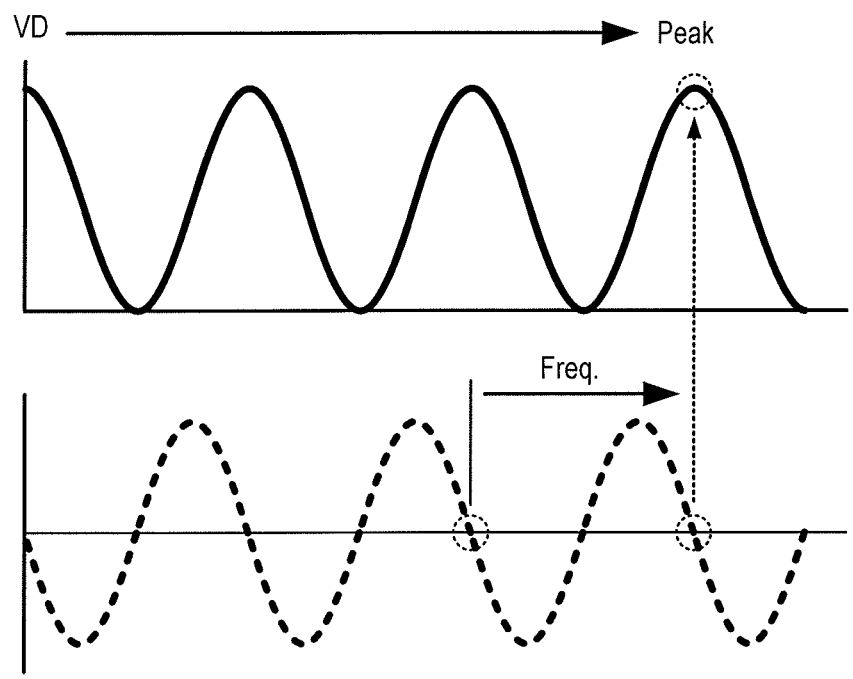

IMAGE CAPTURING APPARATUS, IMAGE CAPTURING METHOD, AND CONTROL METHOD FOR REDUCING THE INFLUENCE OF FLICKER ON STILL IMAGE EXPOSURE

BACKGROUND OF THE INVENTION

Field of the Invention

The present invention relates to an image capturing apparatus, an image capturing method, and a control method.

Description of the Related Art

When shooting photographs under artificial light sources that flicker, the amount of light is low, and it has thus been impossible to shoot photographs at higher shutter speeds. As such, exposure unevenness caused by flicker has thus far not posed a very serious problem. However, recent years have seen higher ISO capabilities in digital cameras, which has made it possible to shoot at high shutter speeds even under artificial light sources that flicker. When continuous shots are taken at a high shutter speed under a flickering light source, the exposure amount will vary from frame to frame due to changes in the amount of external light.

In light of this problem, Japanese Patent Laid-Open No. 2006-222935 proposes a technique that detects flicker in illumination light, and in the case where an exposure time is shorter than the cycle of the flicker, adjusts the timing at which an image is captured so that the center of the exposure time essentially matches the timing at which the illumination light is at a maximum value.

However, according to the technique disclosed in Japanese Patent Laid-Open No. 2006-222935, the flicker is detected using a dedicated microcomputer and photoelectric conversion element for flicker detection. Although detecting flicker using a photoelectric conversion element (an image sensor) for capturing images can be considered, live view operation, in which images captured by the photoelectric conversion element for capturing images are displayed continuously in a display apparatus, typically displays an image in which exposure unevenness caused by flicker is suppressed. It is difficult to detect the timing at which the amount of illumination light is at a maximum value from an image in which exposure unevenness caused by flicker has been suppressed, and thus the influence of the flicker on still image exposure cannot be reduced.

SUMMARY OF THE INVENTION

Having been achieved in light of the aforementioned situation, the present invention provides a technique that reduces the influence of flicker on still image exposure.

According to an aspect of the present invention, there is provided an image capturing apparatus comprising: an image capturing unit; a control unit configured to control the image capturing unit to capture a first image having exposure unevenness caused by flicker in a light source; a detection unit configured to detect a timing at which there is a low change in a light amount caused by the flicker, based on the exposure unevenness in the first image; and an accepting unit configured to accept an image capturing instruction, wherein the control unit controls the image capturing unit to capture a second image at the detected timing in response to the image capturing instruction.

According to another aspect of the present invention, there is provided an image capturing apparatus comprising: an image capturing unit having an image sensor that starts exposure at different timings from region to region; a calculation unit configured to calculate a timing at which a light amount of a light source meets a predetermined condition based on image data obtained by the image capturing unit; and a determination unit configured to determine an exposure timing for the image capturing unit based on the timing that meets the predetermined condition calculated by the calculation unit, wherein the image capturing unit obtains image data using a first exposure time that is shorter than a cycle of a change in a light amount of a flickering light source during a period from when image data for a moving picture starts to be obtained to when image data for a still image starts to be obtained; the calculation unit calculates the timing that meets the predetermined condition based on the image data obtained using the first exposure time; and the determination unit determines the exposure timing for the image capturing unit for obtaining the image data for a still image based on the timing that meets the predetermined condition calculated by the calculation unit.

According to yet another aspect of the present invention, there is provided an image capturing method for an image capturing apparatus that includes an image capturing unit, the method comprising: a controlling step of controlling the image capturing unit to capture a first image having exposure unevenness caused by flicker in a light source; a detecting step of detecting a timing at which there is a low change in a light amount caused by the flicker, based on the exposure unevenness in the first image; and an accepting step of accepting an image capturing instruction, wherein in the controlling step, the image capturing unit is controlled to capture a second image at the detected timing in response to the image capturing instruction.

According to another aspect of the present invention, there is provided a control method for an image capturing apparatus including an image capturing unit having an image sensor that starts exposure at different timings from region to region, the method comprising: a calculating step of calculating a timing at which a light amount of a light source meets a predetermined condition based on image data obtained by the image capturing unit; a determining step of determining an exposure timing for the image capturing unit based on the timing that meets the predetermined condition calculated in the calculating step; and an obtaining step of obtaining image data using a first exposure time that is shorter than a cycle of a change in a light amount of a flickering light source during a period from when image data for a moving picture starts to be obtained to when image data for a still image starts to be obtained, wherein in the calculating step, the timing that meets the predetermined condition is calculated based on the image data obtained using the first exposure time; and in the determining step, the exposure timing for the image capturing unit for obtaining the image data for a still image is determined based on the timing that meets the predetermined condition calculated in the calculating step.

Further features of the present invention will become apparent from the following description of exemplary embodiments (with reference to the attached drawings).

BRIEF DESCRIPTION OF THE DRAWINGS

FIG. 10 is a diagram illustrating a change in the light amount in the vertical direction (indicated by a solid line) and a difference from an adjacent change in the light amount (indicated by a broken line), in an image C shown in FIG. 9.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

The following embodiments will describe an interchangeable lens-type digital single-lens reflex camera as an example of an image capturing apparatus. However, the present invention is not limited to such a digital single-lens reflex camera, and can also be applied in a digital camera having a built-in lens, for example.

First Embodiment

Figure 1:
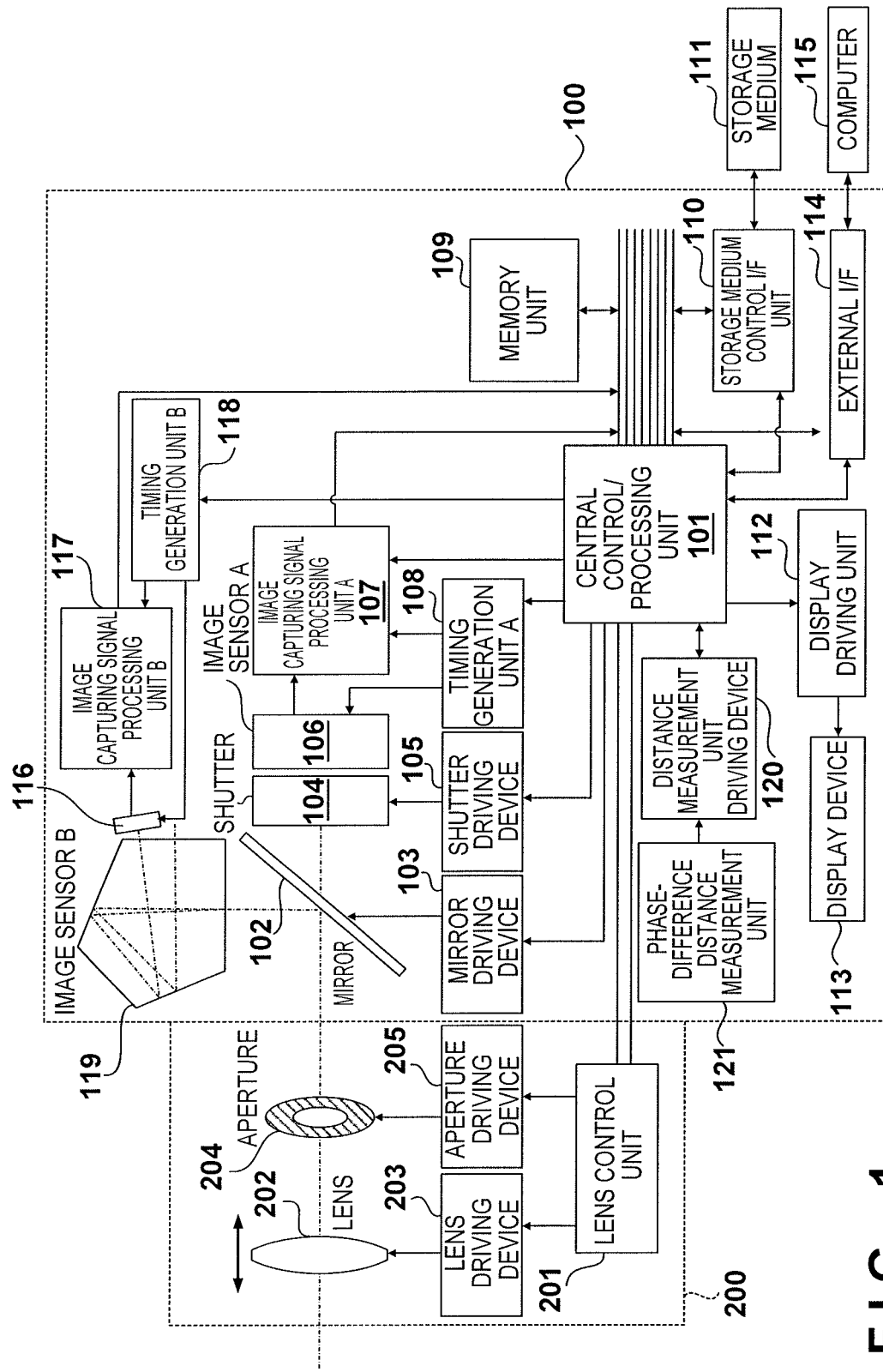
FIG. 1 is a block diagram illustrating the configuration of a digital single-lens reflex camera 100, and an interchangeable lens 200 that can be attached to/removed from the digital single-lens reflex camera 100, according to a first embodiment.
Figure 2:
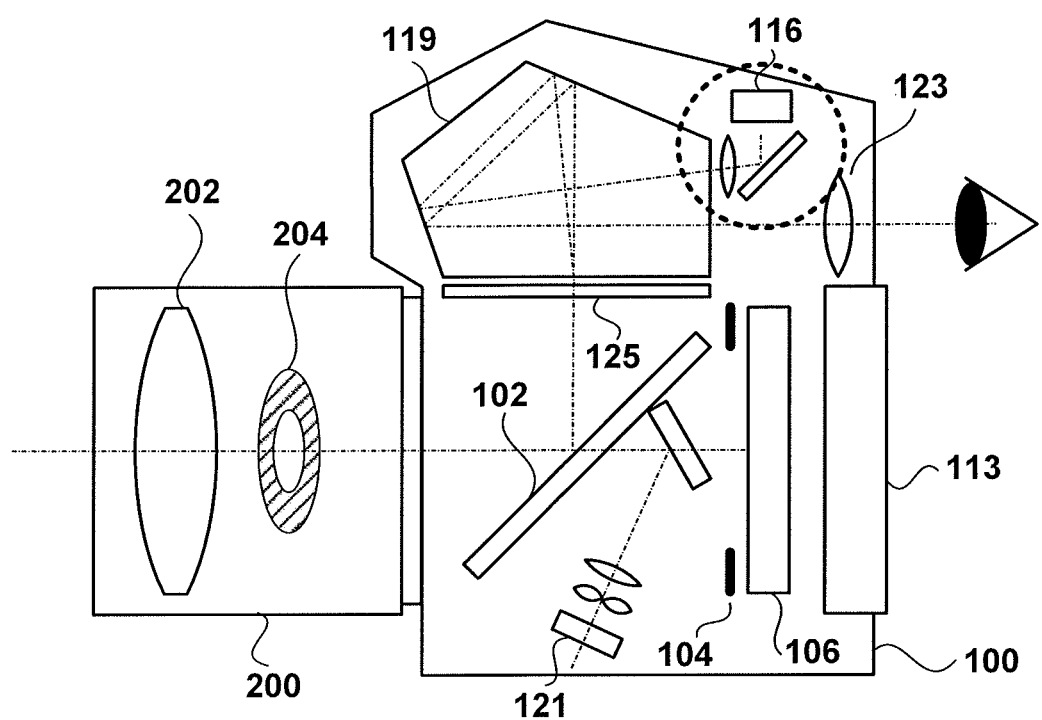
FIG. 2 is a diagram illustrating a physical layout of the respective blocks indicated in FIG. 1.

FIG. 1 is a block diagram illustrating the configuration of a digital single-lens reflex camera 100, and an interchangeable lens 200 that can be attached to/removed from the digital single-lens reflex camera 100, according to a first embodiment. FIG. 2 is a diagram illustrating a physical layout of the respective blocks indicated in FIG. 1.

As shown in FIGS. 1 and 2, a central control/processing unit 101 carries out various types of computational processes, and carries out overall control of the digital single-lens reflex camera 100 and the interchangeable lens 200. The interchangeable lens 200 is an interchangeable lens for a digital signal-lens reflex camera.

An image capturing lens 202 forms an optical image of an object on an image sensor A 106 (a second image sensor). A lens driving device 203 drives the image capturing lens 202 to an in-focus position. An aperture mechanism 204 controls the amount of light reflected from an object that traverses the image capturing lens 202. An aperture driving device 205 drives the aperture mechanism 204.

The interchangeable lens 200 can be removed from the digital single-lens reflex camera 100. Communication for exchanging information is carried out between the interchangeable lens 200 and the digital single-lens reflex camera 100. This communication is carried out by the central control/processing unit 101 and a lens control unit 201 communicating, and manages the sending/receiving of information.

A quick return (QR) mirror 102 conveys an optical image that has traversed the image capturing lens 202 to a viewfinder 123 and an image sensor B 116 for AE (a first image sensor) when the viewfinder 123 is in use. Meanwhile, the QR mirror 102 flips up and conveys the optical image to the image sensor A 106 when capturing an image. A mirror driving device 103 drives the QR mirror 102.

A shutter mechanism 104 includes what is known as a focal-plane shutter curtain, corresponding to front and rear curtains, used in single-lens reflex cameras, controls the exposure time of the optical image that has traversed the image capturing lens 202, and blocks light. A shutter driving device 105 drives the shutter mechanism 104.

The image sensor A 106 captures the optical image of an object formed by the image capturing lens 202 as an image signal. In the present embodiment, the image sensor A 106 is configured of, for example, a two-dimensional X-Y addressing type image sensor, such as a CMOS sensor. In addition, in the present embodiment, a rolling shutter method, in which charge accumulation periods are controlled on a line-by-line basis through addressing and each line is read out in sequence, is employed. In other words, the image sensor A 106 is an image sensor in which exposure starts at different timings from region to region.

An image capturing signal processing unit A 107 carries out an amplifying process on the image signal output from the image sensor A 106, an A/D conversion process for converting from analog to digital, various types of correction processes, such as defect correction, on the post A/D conversion image data, a compression process for compressing the image data, and so on. A timing generation unit A 108 outputs various types of timing signals to the image sensor A 106 and the image capturing signal processing unit A 107.

A memory unit 109 temporarily stores image data and the like that has been processed by the image capturing signal processing unit A 107, and permanently stores various types of adjustment values, programs for causing the central control/processing unit 101 to execute various types of control, and so on.

A recording medium control interface (I/F) unit 110 carries out a process for recording image data and the like into a recording medium 111 and a process for reading out image data and the like from the recording medium 111. The recording medium 111 is a removable recording medium, configured of a semiconductor memory or the like, that records various types of data such as image data.

A display driving unit 112 drives a display device 113 that displays captured still images, moving pictures, or the like. An external interface (I/F) 114 exchanges information such as image signals, control signals, and so on with an external device such as a computer 115.

The image sensor B 116 is an image sensor for obtaining an AE signal/light source detection signal, and is an RGB imager-type sensor. A CCD or CMOS image sensor is used here.

An image capturing signal processing unit B 117 carries out an amplifying process on the image signal output from the image sensor B 116, an A/D conversion process for converting from analog to digital, various types of correction processes, such as defect correction, on the post A/D conversion image data, a compression process for compressing the image data, and so on. A timing generation unit B 118 outputs various types of timing signals to the image sensor B 116 and the image capturing signal processing unit B 117.

A pentaprism 119 conveys light rays bent by the QR mirror 102 to the viewfinder 123 and the image sensor B 116. A phase-difference distance measurement unit 121 is a phase-difference-type distance measurement unit, and using the light rays that have traversed the QR mirror 102, obtains a pair of two images whose phases vary depending on a defocus amount of the object. The central control/processing unit 101 calculates the defocus amount of the object based on an amount of separation between the two images, and moves the image capturing lens 202. A distance measurement unit driving device 120 drives the phase-difference distance measurement unit 121.

Figure 3:
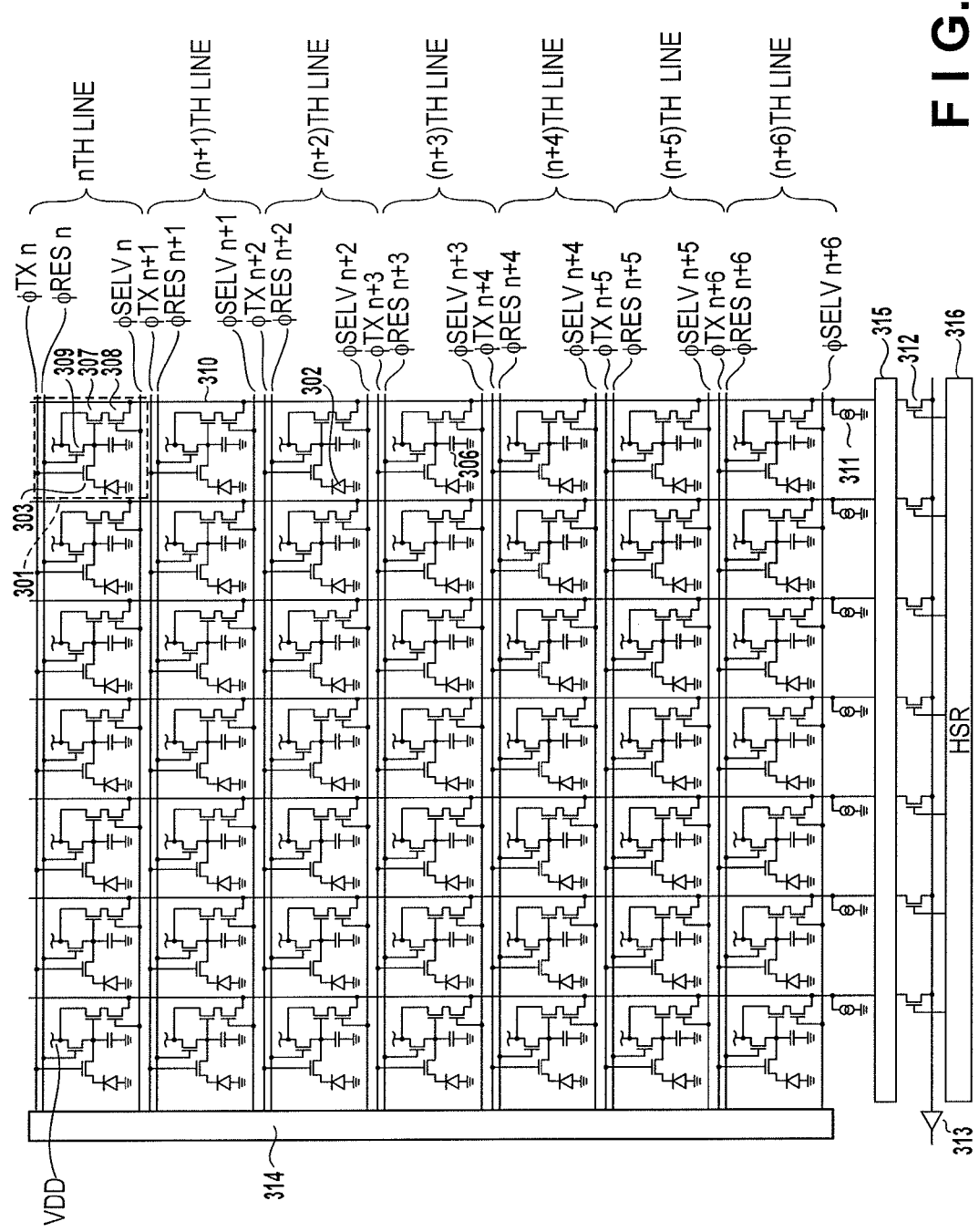
FIG. 3 is a diagram illustrating an overview of the configuration of an image sensor A 106 provided in the digital single-lens reflex camera 100.

FIG. 3 is a diagram illustrating an overview of the configuration of the image sensor A 106 provided in the digital single-lens reflex camera 100. The image sensor A 106 employs a two-dimensional scanning method. In FIG. 3, 301 indicates a single pixel, which serves as a unit to be driven. 302 indicates a photodiode (PD) that converts light into an electrical charge. 306 indicates a floating diffusion (FD), serving as a region that temporarily accumulates a charge. 303 indicates a transfer switch that transfers the charge produced by the PD 302 to the FD 306 in response to a transfer pulse pTX. 307 indicates an MOS amplifier that functions as a source follower. 308 indicates a selection switch that selects a pixel in response to a selection pulse pSELV. 309 indicates a reset switch that clears the charge accumulated in the FD 306 in response to a reset pulse TRES.

311 indicates a constant current source that serves as a load of the MOS amplifier 307. 315 indicates a readout circuit that reads out the charge accumulated in the FD 306 of a pixel selected by the selection switch 308 as pixel data via a signal output line 310 after the charge has been converted into a voltage through charge/voltage conversion performed by the MOS amplifier 307 and the constant current source 311. 312 indicates a selection switch that selects the pixel data (a pixel signal) read out by the readout circuit 315 and is driven by a horizontal scanning circuit 316. The pixel data selected by the horizontal scanning circuit 316 is amplified by an output amplifier 313 and output from the image sensor A 106. 314 indicates a vertical scanning circuit for selecting the switches 303, 308, and 309.

Here, with respect to φTX, φRES, and φSELV, the nth scanning lines scanned and selected by the vertical scanning circuit 314 are indicated as pTXn, φRESn, and φSELVn, respectively, and the n+1th scanning lines are indicated as φTXn+1, φRESn+1, and φSELVn+1, respectively. Only the nth scanning line to the (n+6)th scanning line are shown in FIG. 3 for the sake of simplicity. In addition, a "floating diffusion amplifier" is configured by the FD 306, the MOS amplifier 307, and the constant current source 311.

Figure 4:
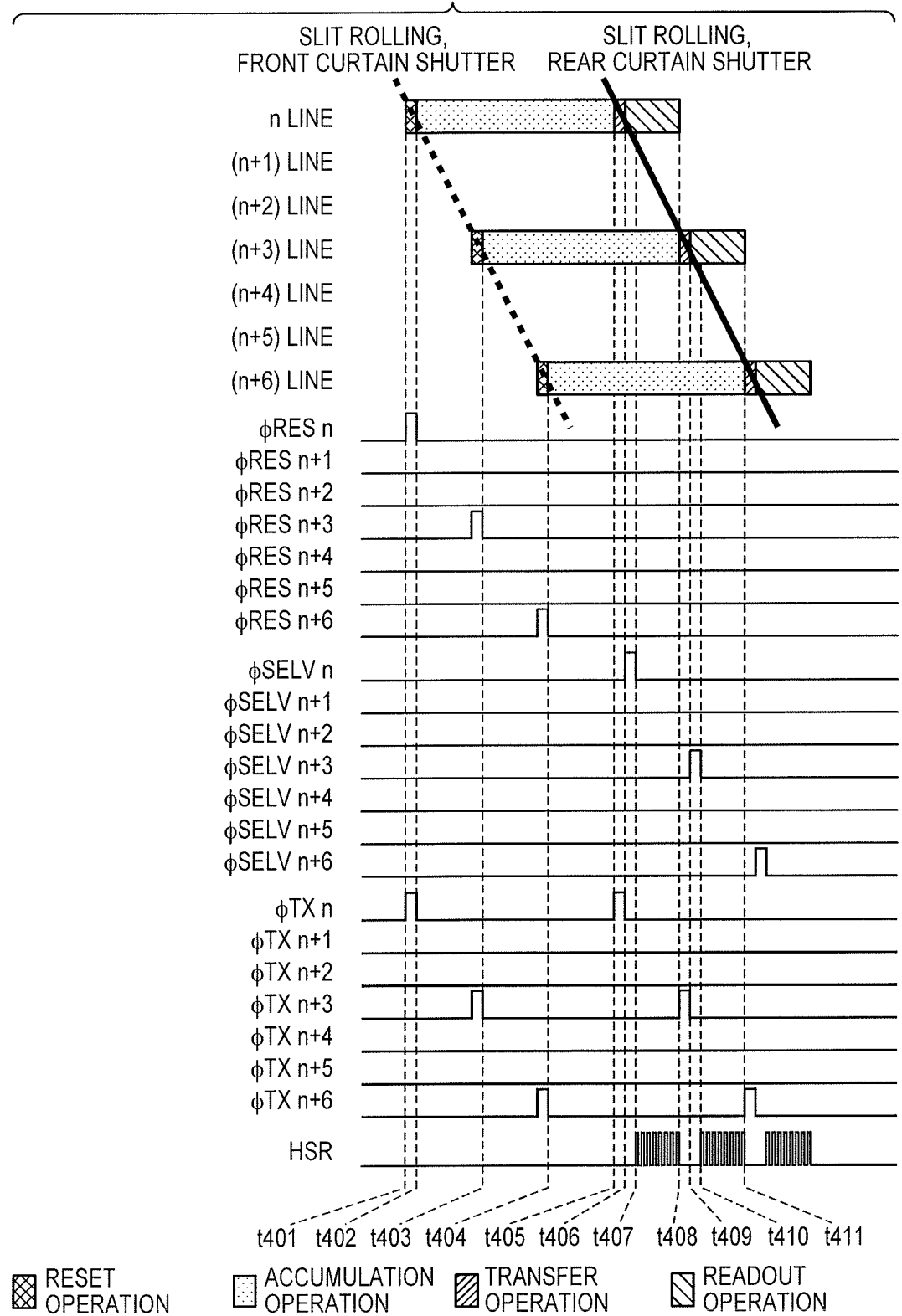
FIG. 4 is a timing chart illustrating slit rolling shutter operations.

Next, slit rolling shutter operations for controlling the exposure amount of the image sensor A 106 will be described using FIG. 4. FIG. 4 is a timing chart illustrating operations performed by the image sensor reading out pixel data during slit rolling shutter shooting, where the exposure amount is controlled to an appropriate amount using an electronic front curtain shutter and an electronic rear curtain shutter.

When the electronic front curtain shutter operates, in the nth line, a pulse is first applied to φRESn and φTXn from time t401 to t402, and the transfer switch 303 and the reset switch 309 turn on. As a result, a reset operation is carried out by clearing an unnecessary charge accumulated in the PD 302 and the FD 306 of the nth line. Next, at time t402, the application of the pulse to φRESn and φTXn is stopped, the transfer switch 303 and the reset switch 309 turn off, and a charge starts being accumulated in the PD 302 of the nth line.

The (n+1)th line and the (n+2)th line are not used for images, and thus no processing is carried out here with respect to those lines. In the present embodiment, no processing is carried out for the (n+1)th line and the (n+2)th line. However, because the charge accumulated in the PD may leak to pixels in the periphery, it is necessary to turn φRESn and φTXn on in the (n+1)th line and the (n+2)th line and keep the charge in the PD 302 reset.

Like time t402, charge accumulation begins in the (n+3)th line at time t403 and charge accumulation begins in the (n+6)th line at time t404. In this manner, electronic front curtain shutter operations are realized by canceling the reset state and starting charge accumulation operations in sequential lines over a set interval.

Returning to the nth line, from time t405 to t406, a pulse is applied to cpTXn, the transfer switch 303 is turned on, and a transfer operation for transferring the charge accumulated in the PD 302 to the FD 306 is carried out. After the transfer operation is finished for the nth line, from time t406 to t407, a pulse is applied to pSELVn and the selection switch 308 is turned on; as a result, the charge held in the FD 306 is converted to a voltage and is output to the readout circuit 315 as the pixel data (a pixel signal). The pixel data temporarily held in the readout circuit 315 is sequentially output by the horizontal scanning circuit 316 from time t407. The readout of the pixel data from the pixels in the nth line ends at time t408.

In the (n+3)th line, from time t408 to t409, a pulse is applied to φTXn+3, the transfer switch 303 is turned on, and a transfer operation for transferring the charge accumulated in the PD 302 to the FD 306 is carried out. After the transfer operation is finished for the (n+3)th line, from time t409 to t410, a pulse is applied to φSELVn+3 and the selection switch 308 is turned on; as a result, the charge held in the FD 306 is converted to a voltage and is output to the readout circuit 315 as the pixel data. The pixel data temporarily held in the readout circuit 315 is sequentially output by the horizontal scanning circuit 316 from time t410. The readout of the pixel data from the pixels in the (n+3)th line ends at time t411.

In this manner, an electronic rear curtain shutter is realized by carrying out charge transfer and readout during a set interval. The time from PD reset to transfer in each line corresponds to the exposure time for each pixel.

Figure 5:
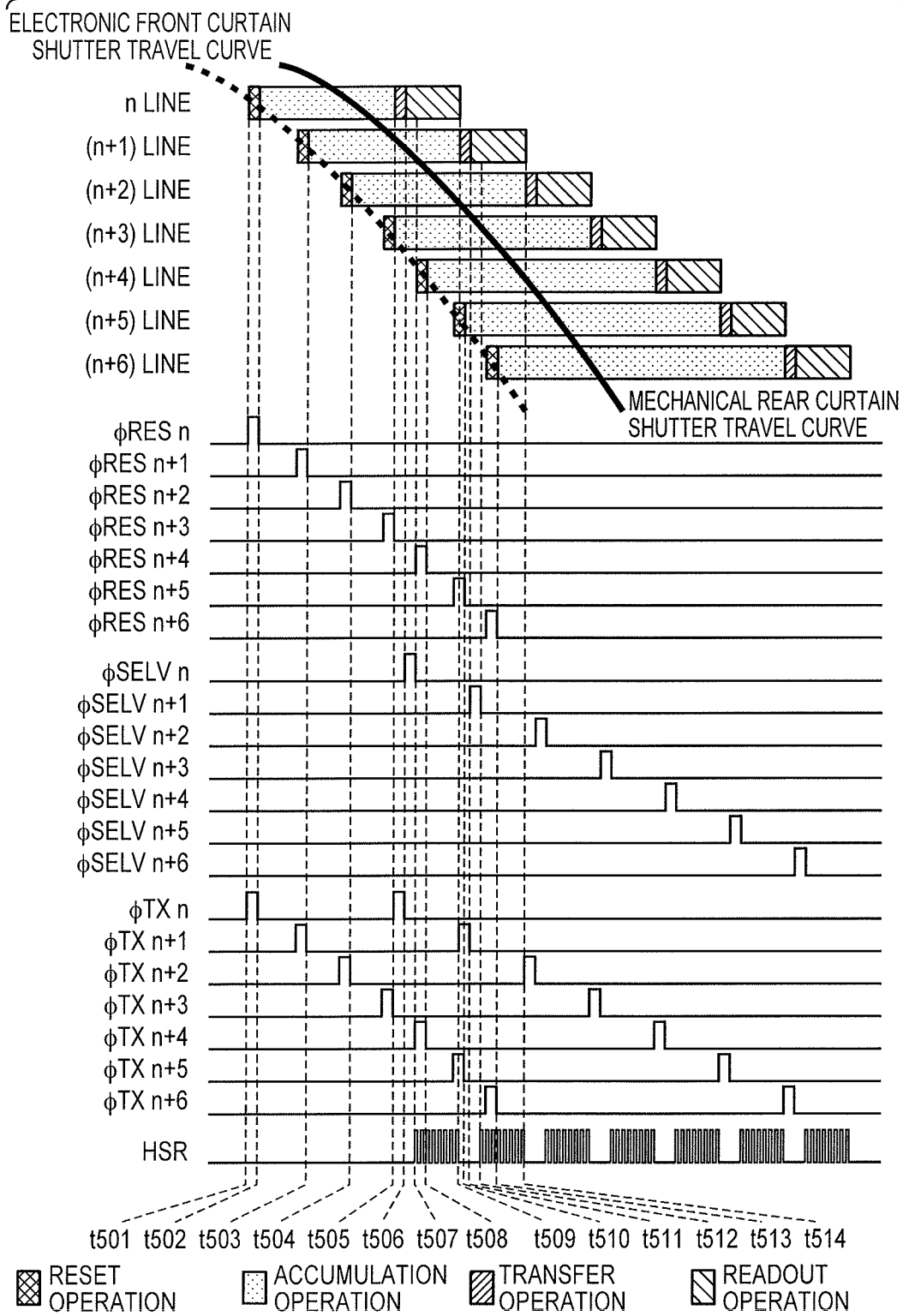
FIG. 5 is a timing chart illustrating electronic front curtain shutter operations using an electronic front curtain shutter and a mechanical rear curtain shutter.

Next, electronic front curtain shutter operations for controlling the exposure amount of the image sensor A 106 using an electronic front curtain shutter and a mechanical rear curtain shutter will be described using FIG. 5. FIG. 5 is a timing chart illustrating operations performed by the image sensor reading out pixel data during electronic front curtain shutter shooting, where the exposure amount is controlled to an appropriate amount using an electronic front curtain shutter and a mechanical rear curtain shutter.

When the electronic front curtain shutter operates, in the nth line, a pulse is first applied to φRESn and φTXn from time t501 to t502, and the transfer switch 303 and the reset switch 309 turn on. As a result, a reset operation is carried out by clearing an unnecessary charge accumulated in the PD 302 and the FD 306 of the nth line. Next, at time t502, the application of the pulse to φRESn and φTXn is stopped, the transfer switch 303 and the reset switch 309 turn off, and a charge starts being accumulated in the PD 302 of the nth line.

Likewise, charge accumulation operations begin for the (n+1)th line at time t503, for the (n+2)th line at time t504, for the (n+3)th line at time t505, and for the (n+4)th line at time t508. Meanwhile, charge accumulation operations begin for the (n+5)th line at time t510 and for the (n+6)th line at time t513. In this manner, electronic front curtain shutter operations are realized by canceling the reset state and starting charge accumulation operations in sequential lines.

After these operations, the mechanical rear curtain shutter moves. The time between the electronic front curtain shutter and the mechanical rear curtain shutter corresponds to the exposure time, and the timing at which the electronic front curtain shutter is reset is controlled so that there is an appropriate exposure amount in each line.

Returning to the nth line, from time t505 to t506, a pulse is applied to cpTXn, the transfer switch 303 is turned on, and a transfer operation for transferring the charge accumulated in the PD 302 to the FD 306 is carried out. After the transfer operation is finished for the nth line, from time t506 to t507, a pulse is applied to cpSELVn and the selection switch 308 is turned on; as a result, the charge held in the FD 306 is converted to a voltage and is output to the readout circuit 315 as the pixel data (a pixel signal). The pixel data temporarily held in the readout circuit 315 is sequentially output by the horizontal scanning circuit 316 from time t507. The readout of the pixel data from the pixels in the nth line ends at time t509.

In the (n+1)th line, from time t509 to t511, a pulse is applied to φTXn+1, the transfer switch 303 is turned on, and a transfer operation for transferring the charge accumulated in the PD 302 to the FD 306 is carried out. After the transfer operation is finished for the (n+1)th line, from time t511 to t512, a pulse is applied to φSELVn+1 and the selection switch 308 is turned on; as a result, the charge held in the FD 306 is converted to a voltage and is output to the readout circuit 315 as the pixel data. The pixel data temporarily held in the readout circuit 315 is sequentially output by the horizontal scanning circuit 316 from time t512. The readout of the pixel data from the pixels in the (n+1)th line ends at time t513.

Figure 6:
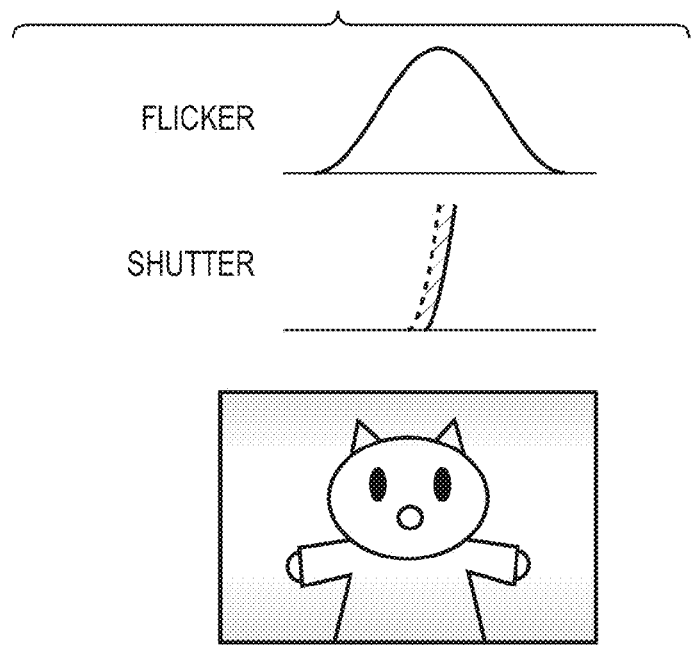
FIG. 6 is a diagram illustrating an image shot when a light amount of a flickering light source is high.
Figure 7:
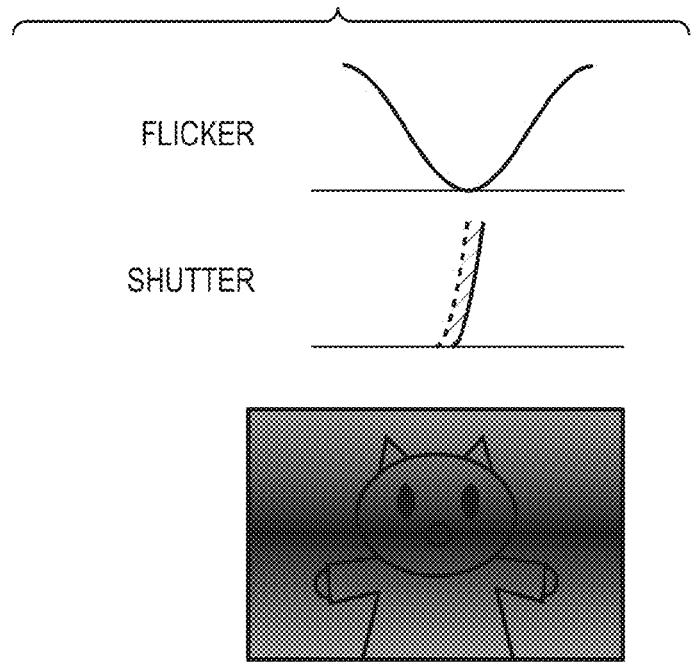
FIG. 7 is a diagram illustrating an image shot when a light amount of a flickering light source is low.

FIGS. 6 and 7 illustrate changes in the light amount of a flickering light source, a timing at which a shutter releases, and a still image captured at that timing. With respect to the timing of the shutter release, the shutter is illustrated in FIG. 5 as moving from top to bottom in accordance with the scanning direction of the image sensor; however, because a shutter actually travels from bottom to top relative to the camera, the shutter is illustrated in FIGS. 6 and 7 as moving from bottom to top in accordance therewith. FIGS. 5, 6, and 7 all illustrate the same operations.

Recent digital cameras have higher and higher levels of sensitivity, and it is now possible to shoot images at high shutter speeds, such as 1/4000 second, 1/8000 second, and so on even in artificially-lit environments where high-shutter speed shooting has not conventionally been possible, such as gymnasiums and the like. For example, consider a case where an image is captured at a high shutter speed under a light source where the light amount varies, such as a fluorescent lamp. If the shutter is released when there is a high amount of light, as indicated in FIG. 6, a still image with a higher exposure will be captured, whereas conversely, if the shutter is released when there is a low amount of light, as indicated in FIG. 7, an underexposed still image will be captured. The timing at which to release the shutter is too fast for a human to intentionally achieve, and thus in actuality, exposure unevenness, in which the still images are shot at various exposure amounts, will result.

Accordingly, in the present embodiment, the digital single-lens reflex camera 100 detects, as an example of a timing at which the light amount from the light source meets a predetermined condition, a timing at which there is a low amount of change in the light amount caused by flicker, and captures an image at the detected timing. Although the "timing at which there is a low amount of change in the light amount caused by flicker" typically corresponds to a timing at which the light amount is at a peak, or in other words, the shutter timing indicated in FIG. 6, the timing is not limited thereto. For example, as long as the light amount does not result in serious underexposure, a timing at which the light amount is lower than the peak amount can also correspond to the "timing at which there is a low amount of change in the light amount caused by flicker". In addition, for example, if a gain is set to correspond to 80% of the peak light amount, a properly-exposed image will be obtained if the image is captured at a timing when the light amount is 80% of the peak amount. Accordingly, in this case, a timing at which the light amount is 80% of the peak amount can also correspond to the "timing at which there is a low amount of change in the light amount caused by flicker".

Figure 8:
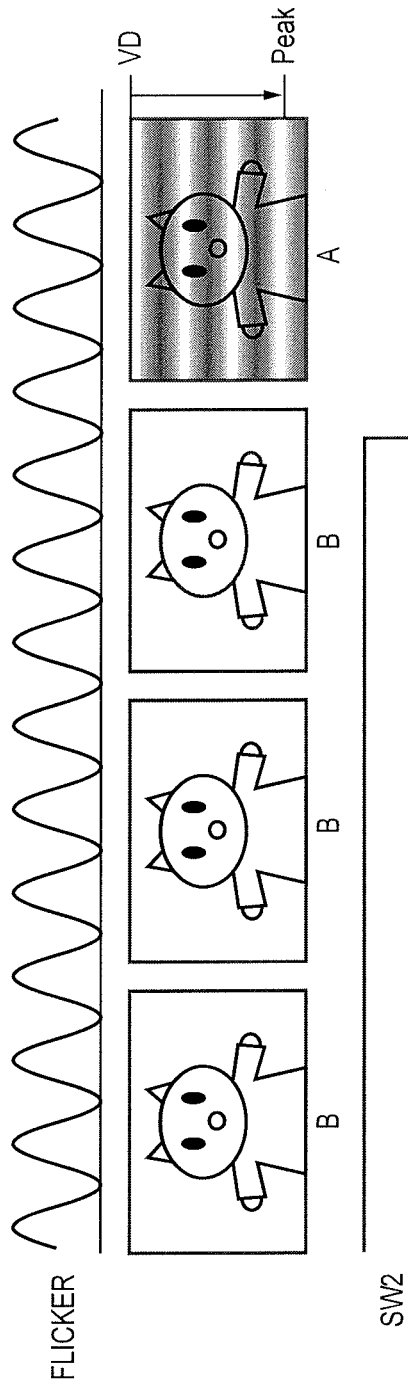
FIG. 8 is a conceptual diagram illustrating a process for detecting a timing at which there is a low change in a light amount caused by flicker.

FIG. 8 is a conceptual diagram illustrating a process for detecting a timing at which a change in a light amount caused by flicker is low. FIG. 8 illustrates a change in the light amount of a flickering light source, a live view display (LV display) image in which there is no exposure unevenness (a third image), and a timing detection image in which there is exposure unevenness (a first image). FIG. 8 furthermore indicates a timing at which SW2 (a shutter switch for actually capturing an image) has been pressed.

Until SW2 is pressed (in other words, until the central control/processing unit 101 accepts an image capturing instruction), the digital single-lens reflex camera 100 periodically obtains normal LV display images (the three images B shown in FIG. 8), in which the exposure time is controlled and there is no exposure unevenness caused by flicker. The digital single-lens reflex camera 100 realizes the LV display by displaying the obtained images in the display device 113. The exposure time is controlled by accumulating charges for a time that is an integral multiple of the flicker cycle, or by accumulating charges for a time that is sufficiently longer than the flicker cycle. This makes it possible to prevent exposure unevenness from occurring due to flicker. Then, when SW2 is pressed, the digital single-lens reflex camera 100 controls the exposure time and intentionally obtains an image in which exposure unevenness has occurred due to flicker (an image A shown in FIG. 8). However, this image is not displayed in the display device 113. The exposure time is controlled at this time by controlling the exposure to a time that is shorter than the flicker cycle. This makes it possible to intentionally cause exposure unevenness to occur due to flicker.

In the present embodiment, the digital single-lens reflex camera 100 detects the timing at which the light amount is maximum from the flicker cycle and a vertical synchronization signal (VD) based on the image in which there is exposure unevenness caused by flicker and the images in which there is no exposure unevenness caused by flicker. If the timing at which the light amount is maximum can be discovered from the flicker cycle and VD, a timing at which there is a low change in the light amount caused by flicker can be found as well. Thereafter, the digital single-lens reflex camera 100 obtains an image in which there is a low change in the light amount (a second image) based on a result of the detection. This makes it possible to obtain an image in which the influence of flicker on the exposure has been suppressed.

Figure 9:
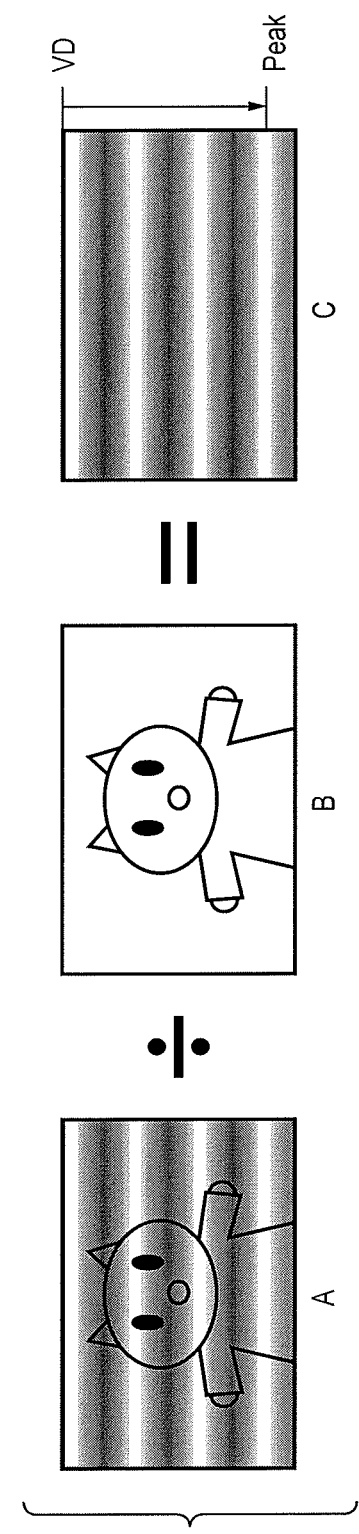
FIG. 9 is a conceptual diagram illustrating a computational process for detecting a timing at which there is a low change in light amount based on an image that has exposure unevenness and an image that does not have exposure unevenness.

FIG. 9 is a conceptual diagram illustrating a computational process for detecting a timing at which there is a low change in light amount based on an image that has exposure unevenness and an image that does not have exposure unevenness. The digital single-lens reflex camera 100 divides an image A by an image B in order to obtain an image C, in which only a flicker component has been extracted from the image A and the image B. The image B used here is typically the image B obtained last, but is not limited thereto. Based on a striped pattern in the image C (that is, luminance changes in the image) obtained in this manner, the digital single-lens reflex camera 100 detects the timing at which the light amount is maximum from the flicker cycle and VD, and detects the timing at which there is a low change in the light amount.

Note that the image A is an image captured at an exposure time shorter than the cycle of the change in the light amount of the flickering light source, in order to produce exposure unevenness due to flicker; conversely, the image B is an image captured at an exposure time that is an integral multiple or greater of the cycle of the change in the light amount of the flickering light source, in order to ensure that exposure unevenness due to flicker does not occur. Accordingly, in the case where the image A and the image B are captured under the same conditions aside from the exposure time, the two images will have different exposure amounts due to the difference in exposure times. Accordingly, the digital single-lens reflex camera 100 matches the exposure amounts of the image A and the image B by adjusting the sensor gain when the images are obtained, applying gain to the obtained images, or the like. In addition, in the case where an object has changed positions between when the image A was captured and the image B was captured, the orientation of the camera has changed, or the like, the digital single-lens reflex camera 100 divides the image into sections, calculates a degree to which the respective images match, and aligns the positions of the images before carrying out the division.

FIG. 10 is a diagram illustrating a change in the light amount in the vertical direction (indicated by a solid line) and a difference from an adjacent change in the light amount, in the image C shown in FIG. 9. A method for detecting the timing at which the light amount is maximum from the flicker cycle and VD will be described with reference to FIG. 10. Here, the broken line having a value of "0" indicates that the change in the light amount is at a maximum value or a minimum value. In particular, a value of "0" when the broken line value changes from positive to negative indicates a maximum value. If it is known at what line in the image the maximum value occurs, the amount of time from VD to the maximum value can be found based on the cycle of a horizontal synchronization signal (HD). Furthermore, the flicker cycle can be found by finding the time from "0" to "0" in the broken line. The next image capture timing, or in other words, a timing at which there is a low change in the light amount caused by flicker, can be found from the time of the maximum value found here and the flicker cycle.

Although the digital single-lens reflex camera 100 is described here as detecting the timing based on the image C, or in other words, based on both the image A and the image B, the timing detection may be carried out based only on the image A. As shown in FIG. 9, the same striped pattern that is present in the image C appears in the image A as well, and thus a graph such as that shown in FIG. 10 can be generated based on the image A. It is possible that the graph waveform will be disturbed by the presence of an object in such a case, but this does not necessarily make it impossible to detect the timing. On the other hand, basing the detection on the image C makes it possible to detect the timing more accurately than when basing the detection on the image A only.

Figure 11:
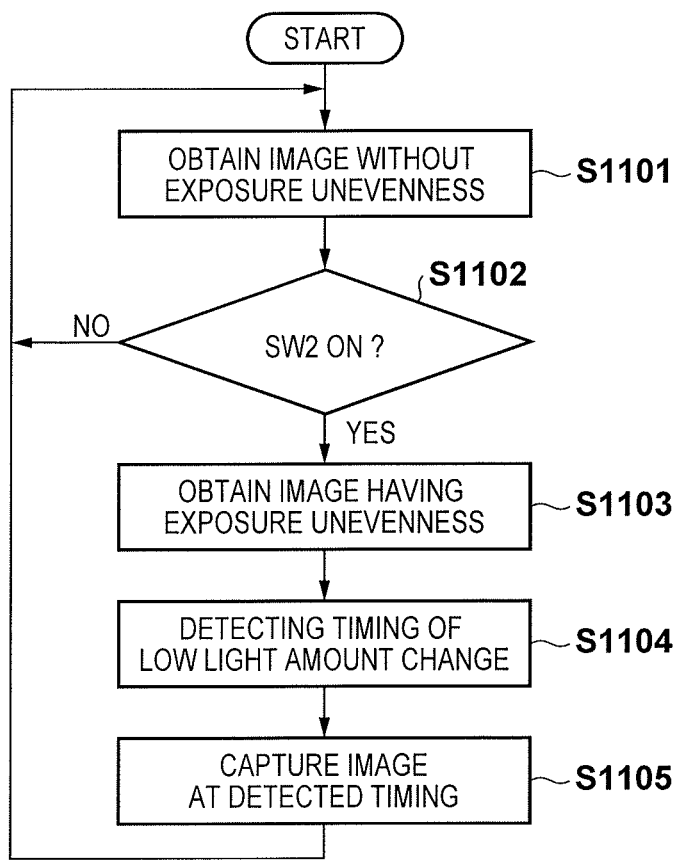
FIG. 11 is a flowchart illustrating an image capturing process performed by the digital single-lens reflex camera 100.

FIG. 11 is a flowchart illustrating an image capturing process performed by the digital single-lens reflex camera 100. Unless otherwise specified, the processes in each step of the flowchart are realized by the central control/processing unit 101 of the digital single-lens reflex camera 100 executing programs stored in a ROM (not shown) and controlling the respective blocks.

In step S1101, the digital single-lens reflex camera 100 captures an image at an exposure time that is an integral multiple or more of the cycle of the change in the light amount of the flickering light source, and obtains an image that does not have exposure unevenness, such as the image B shown in FIG. 8. In step S1102, the digital single-lens reflex camera 100 determines whether or not SW2 has been pressed. The image that does not have exposure unevenness is repeatedly obtained in step S1101 until SW2 is pressed. In step S1103, the digital single-lens reflex camera 100 captures an image at an exposure time that is shorter than the cycle of the change in the light amount of the flickering light source, and obtains an image that has exposure unevenness, such as the image A shown in FIG. 8. In step S1104, the digital single-lens reflex camera 100 detects a timing at which there is a low change in the light amount caused by flicker through the method described with reference to FIGS. 9 and 10. In step S1105, the digital single-lens reflex camera 100 sets an exposure timing for obtaining image data for a still image based on the timing detected in step S1104. The digital single-lens reflex camera 100 then captures an image at the set exposure timing. The process then returns to step S1101, and the process is repeated.

Note that the digital single-lens reflex camera 100 may determine whether or not a light source flickers in advance. In the case where a light source does not flicker, the digital single-lens reflex camera 100 captures an image regardless of the timing detection process when SW2 is pressed.

Figure 12:
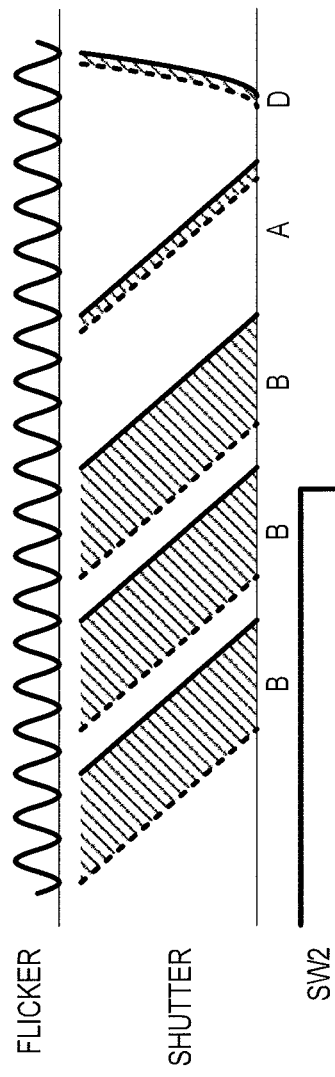
FIG. 12 is a diagram illustrating change in the light amounts caused by flicker and an image accumulation timing corresponding to the image capturing process shown in FIG. 11.

FIG. 12 is a diagram illustrating a change in the light amount caused by flicker and an image accumulation timing corresponding to the image capturing process shown in FIG. 11. In FIG. 12, a dotted line indicates the sensor being reset, a solid line indicates readout, and a span from the dotted line to the solid line in the horizontal direction indicates the image accumulation time. The accumulation time of the image B is sufficiently longer than the flicker cycle, and thus exposure unevenness does not occur due to the flicker. The image B is used for LV display. Here, when SW2 is pressed and an image capturing instruction is accepted, the digital single-lens reflex camera 100 obtains the image A over an accumulation time that is shorter than the flicker cycle. Although exposure unevenness will occur in the image A due to flicker, the image A is not used for LV display. Thereafter, the digital single-lens reflex camera 100 detects the timing at which there is a low change in the light amount caused by flicker, and obtains an image D at the detected timing. Through this, an image in which flicker is not present can be captured even if the image is captured at a high shutter speed under a flickering light source.

It should be noted that for illustrative purposes, in FIG. 12, the time in which the shutter is traveling for the image D is comparatively long and the light amount changes greatly during that time. However, the actual travel time is approximately the same as the time shown in FIG. 6, and the shutter travel ends while the light amount is almost at a maximum. The same applies to the subsequent drawings as well.

As described thus far, according to the first embodiment, the digital single-lens reflex camera 100 first obtains an image having exposure unevenness caused by flicker, detects a timing at which there is a low change in the light amount caused by flicker based on the obtained image, and then captures an image based on the detected timing. For example, in the case where an image capturing instruction has been accepted while moving picture data is being repeatedly obtained, the image data is obtained at an exposure time that is shorter than the cycle of the change in the light amount from the flickering light source during the period from when the image capturing instruction is accepted to when still image data begins to be obtained in response to the image capturing instruction. Through this, the influence of the flicker on the exposure of the still image can be reduced.

Although the present embodiment describes a case where a still image is shot during LV display, it should be noted that the present invention is not limited to such a case. For example, the concept of the present embodiment can also be applied in a case where a still image is shot while shooting a moving picture (in such a case, the image B in FIG. 8 corresponds to a single frame of the moving picture instead of an LV display image).

Variations

Figure 13:
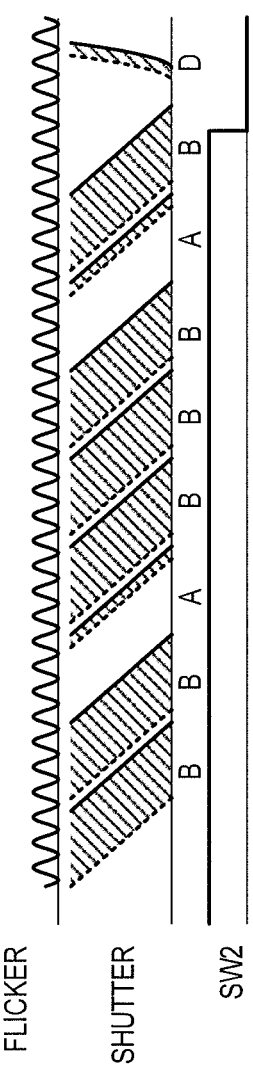
FIG. 13 is a diagram illustrating a first variation on FIG. 12.

FIG. 13 is a diagram illustrating a first variation on FIG. 12. In FIG. 12, the digital single-lens reflex camera 100 obtains the image B for LV display until the SW2 turns on, which corresponds to the timing at which a still image is shot; the digital single-lens reflex camera 100 then begins to obtain the image A for detecting the timing of the flicker after SW2 has turned on. The closer the timing at which the image A is obtained is to the timing at which the still image is shot, the more accurately the timing of the flicker will be detected; as such, the example shown in FIG. 12 is superior in terms of an improvement in the detection accuracy. However, in the example shown in FIG. 12, the image A is obtained after SW2 has been pressed, resulting in a correspondingly longer release time lag until the still image is shot.

Accordingly, in the first variation, while the image B for LV display is being obtained, the digital single-lens reflex camera 100 obtains the image A for detecting the timing of the flicker periodically, approximately once every several times the image B is obtained, as shown in FIG. 13. The image A is not used for LV display at this time. In other words, the image data is obtained using an exposure time that is shorter than the cycle of the change in the light amount of the flickering light source during the period from when a piece of moving picture image data is obtained to when the next piece of moving picture image data is obtained. Then, the digital single-lens reflex camera 100 uses the most recently-obtained image A rather than obtaining the image A after the SW2 turns on. This makes it possible to reduce release time lag.

Figure 14:
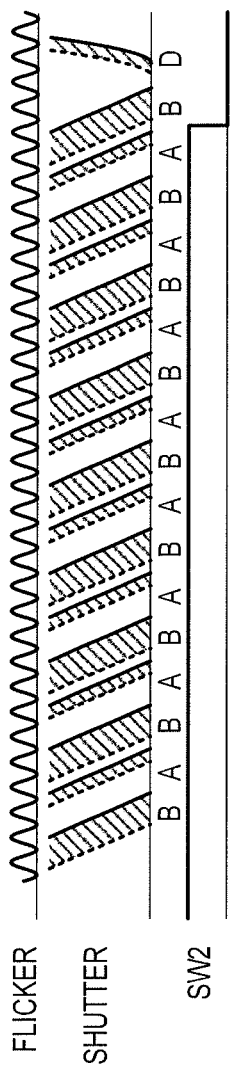
FIG. 14 is a diagram illustrating a second variation on FIG. 12.

FIG. 14 is a diagram illustrating a second variation on FIG. 12. In the first variation (FIG. 13), while the image B for LV display is being obtained, the digital single-lens reflex camera 100 obtains the image A for detecting the timing of the flicker periodically. As such, the display cycle of the image B (that is, the LV display framerate) will be disturbed at the timing at which the image A is obtained.

Accordingly, in the second variation, the digital single-lens reflex camera 100 obtains the image B for LV display and the image A for detecting the timing of the flicker in an alternating manner, at a cycle that is double, as shown in FIG. 14. This makes it possible to ensure that the display cycle will not be disturbed. Although the first variation and the second variation describe cases where a still image is shot during LV display, it should be noted that the present invention is not limited to such cases. For example, the concept of these variations can also be applied in a case where a still image is shot while shooting a moving picture. In this case, the recording medium control interface (I/F) unit 110 does not include the image data obtained at an exposure time that is shorter than the cycle of the change in the light amount of the flickering light source in moving picture information recorded into the recording medium 111 as moving picture data.

Figure 15:
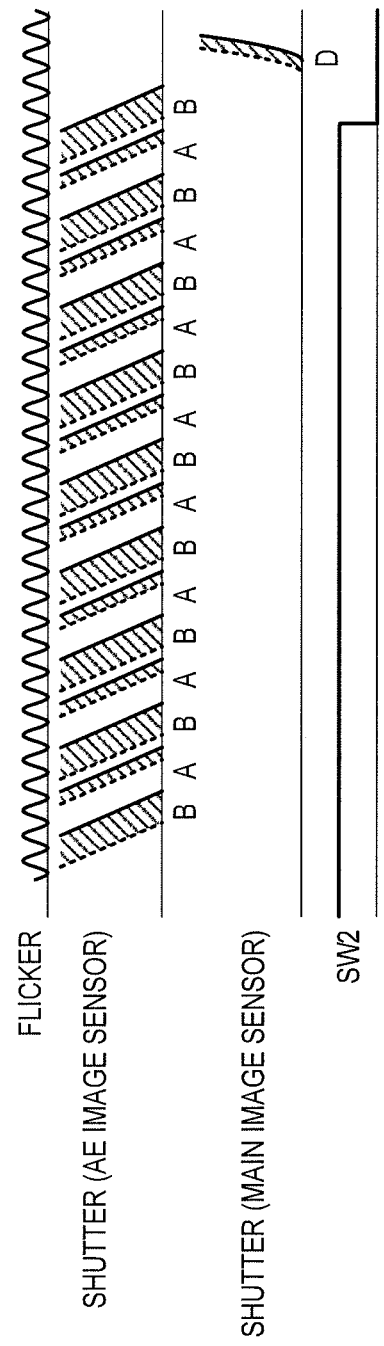
FIG. 15 is a diagram illustrating a third variation on FIG. 12.

FIG. 15 is a diagram illustrating a third variation on FIG. 12. In FIGS. 12 to 14, the digital single-lens reflex camera 100 obtains the image A for detecting the timing of the flicker using the same image sensor as that used to obtain the image B for LV display (the image sensor A 106), and thus the timing of the flicker can only be detected during an LV display mode.

Accordingly, in the third variation, the digital single-lens reflex camera 100 obtains the image A for detecting the timing of the flicker using the image sensor B 116 for AE detection rather than the image sensor A 106 for obtaining an actual image of an object (the image D), as shown in FIG. 15. Through this, the timing of the flicker can be detected even in a state where a shooter is using the viewfinder 123 and there is no object image on the image sensor A 106. The digital single-lens reflex camera 100 then detects the timing of the flicker when the SW2 is pressed and uses the image sensor A 106 to obtain the actual image of the object (the image D).

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiments of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-225817, filed on Oct. 30, 2013, which is hereby incorporated by reference herein in its entirety.

What is claimed is:

1. An image capturing apparatus comprising:
   an image capturing unit having an image sensor that starts exposure at different timings from region to region; and
   at least one processor programmed to function as a calculation unit and a determination unit, wherein:
   the calculation unit is configured to calculate a timing at which a light amount of a light source meets a predetermined condition based on image data obtained by the image capturing unit; and
   the determination unit is configured to determine an exposure timing for the image capturing unit based on the timing that meets the predetermined condition calculated by the calculation unit,
   wherein the image capturing unit obtains image data using a first exposure time that is shorter than a cycle of a change in a light amount of a flickering light source during a period from when the image capturing unit starts to obtain image data for a moving picture to when the image capturing unit starts to obtain image data for a still image;
   the calculation unit calculates the timing that meets the predetermined condition based on the image data obtained using the first exposure time; and
   the determination unit determines the exposure timing for the image capturing unit for obtaining the image data for a still image based on the timing that meets the predetermined condition calculated by the calculation unit.

2. The image capturing apparatus according to claim 1, wherein the calculation unit calculates the timing that meets the predetermined condition based on a result of comparing the image data for a moving picture with the image data obtained using the first exposure time.

3. The image capturing apparatus according to claim 1, further comprising:
   an accepting unit configured to accept an image capturing instruction,
   wherein in a case where the accepting unit has accepted the image capturing instruction while the image data for a moving picture is being repeatedly obtained, the image capturing unit obtains the image data using the first exposure time during a period from when the image capturing instruction is accepted by the accepting unit to when the image data for a still image starts to be obtained in response to the image capturing instruction.

4. The image capturing apparatus according to claim 1, wherein the image capturing unit obtains the image data using the first exposure time during a period from when a piece of the image data for a moving picture is obtained to when a next piece of the image data for a moving picture is obtained.

5. The image capturing apparatus according to claim 4, wherein the at least one processor is further programmed to function as an accepting unit configured to accept an image capturing instruction,
   wherein in a case where the accepting unit has accepted the image capturing instruction while the image data for a moving picture is being repeatedly obtained, the image capturing unit does not obtain the image data using the first exposure time during a period from when the image capturing instruction is accepted by the accepting unit to when the image data for a still image starts to be obtained in response to the image capturing instruction; and
   the calculation unit calculates the timing that meets the predetermined condition based on the image data obtained using the first exposure time before the image capturing instruction is accepted by the accepting unit.

6. The image capturing apparatus according to claim 4, wherein the image capturing unit periodically obtains the image data using the first exposure time.

7. The image capturing apparatus according to claim 6, wherein the calculation unit calculates the timing that meets the predetermined condition based on a latest image data obtained using the first exposure time.

8. The image capturing apparatus according to claim 1, further comprising:
   a display unit configured to continuously display an image based on the image data for a moving picture obtained by the image capturing unit,
   wherein the display unit does not display an image based on the image data obtained using the first exposure time.

9. The image capturing apparatus according to claim 1, wherein the at least one processor is further programmed to function as a storage configured to store moving picture information based on the image data for a moving picture in a storage medium,
   wherein the storage does not include the image data obtained using the first exposure time in the moving picture information.

10. The image capturing apparatus according to claim 1, wherein the image capturing unit obtains the image data for a moving picture using a second exposure time that is equivalent to an integral multiple of the cycle of the change in the light amount of the flickering light source.

11. The image capturing apparatus according to claim 10, wherein the calculation unit calculates the timing that meets the predetermined condition by dividing the image data obtained using the first exposure time by the image data obtained using the second exposure time.

12. The image capturing apparatus according to claim 11, wherein the timing that meets the predetermined condition is a timing at which there is a low change in a light amount caused by flicker.

13. A control method for an image capturing apparatus including an image capturing unit having an image sensor that starts exposure at different timings from region to region, the method comprising:
   calculating a timing at which a light amount of a light source meets a predetermined condition based on image data obtained by the image capturing unit;

determining an exposure timing for the image capturing unit based on the timing that meets the predetermined condition calculated in the calculating; and obtaining image data using a first exposure time that is shorter than a cycle of a change in a light amount of a flickering light source during a period from when the image capturing unit starts to obtain image data for a moving picture to when the image capturing unit starts to obtain image data for a still image, wherein in the calculating, the timing that meets the predetermined condition is calculated based on the image data obtained using the first exposure time; and in the determining, the exposure timing for the image capturing unit for obtaining the image data for a still image is determined based on the timing that meets the predetermined condition calculated in the calculating.

* * * * *